(12) United States Patent
Nagura

(10) Patent No.: US 10,401,152 B2
(45) Date of Patent: Sep. 3, 2019

(54) POSITION DETECTION APPARATUS, FORCE SENSOR, AND APPARATUS

(71) Applicant: CANON KABUSHIKI KAISHA, Tokyo (JP)

(72) Inventor: Chihiro Nagura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 15/451,471

(22) Filed: Mar. 7, 2017

(65) Prior Publication Data
US 2017/0261311 A1 Sep. 14, 2017

(30) Foreign Application Priority Data

Mar. 14, 2016 (JP) ................. 2016-049748

(51) Int. Cl.
*G01B 11/14* (2006.01)
*G02B 27/42* (2006.01)
*G01L 1/24* (2006.01)
*G01L 1/00* (2006.01)

(52) U.S. Cl.
CPC ............. *G01B 11/14* (2013.01); *G01L 1/00* (2013.01); *G01L 1/24* (2013.01); *G02B 27/4255* (2013.01); *G05B 2219/37113* (2013.01); *G05B 2219/37558* (2013.01)

(58) Field of Classification Search
None
See application file for complete search history.

(56) References Cited

U.S. PATENT DOCUMENTS

| 4,620,093 A | * | 10/1986 | Barkhoudarian | ..... G01L 9/0077 250/227.21 |
| 5,260,568 A | * | 11/1993 | Ieki | ...... G01D 5/2455 250/231.18 |
| 5,661,295 A | * | 8/1997 | Fukui | ....... G01D 5/38 250/231.14 |
| 5,678,319 A | * | 10/1997 | Huber | ...... G01D 5/38 33/707 |

(Continued)

FOREIGN PATENT DOCUMENTS

| JP | 2005147828 A | 6/2005 |
| JP | 2005326232 A | 11/2005 |

(Continued)

*Primary Examiner* — Nathaniel T Woodward
(74) *Attorney, Agent, or Firm* — Rossi, Kimms & McDowell LLP

(57) ABSTRACT

A position detection apparatus that illuminates light from a light source unit onto an object and that receives reflected light from the object on a light receiver to detect position information of the object, includes a detector (10) and a signal processor (102), the detector includes a first grating (15) in an optical path between the light source unit and the object, a second grating (16) in an optical path between the object and the light receiver, and a third grating (17) in an optical path between the second grating and the light receiver, the signal processor acquires the position information of the object based on a phase variation of the second periodic image detected by the light receiver, and the position information of the object is information related to a distance from the detector to the object.

11 Claims, 9 Drawing Sheets

(56) References Cited

U.S. PATENT DOCUMENTS

| | | | |
|---|---|---|---|
| 6,831,267 B2* | 12/2004 | Ishizuka | G01D 5/38 250/231.13 |
| 7,319,526 B2 | 1/2008 | Takahashi | |
| 8,228,508 B2* | 7/2012 | Ishizuka | G01D 5/38 356/499 |
| 9,395,176 B2 | 7/2016 | Saendig | |
| 2005/0140985 A1* | 6/2005 | Takahashi | G01D 5/38 356/499 |
| 2011/0235051 A1* | 9/2011 | Huber | G01B 11/14 356/499 |
| 2012/0250031 A1* | 10/2012 | Ikeda | B62M 6/50 356/499 |
| 2015/0116731 A1 | 4/2015 | Huber et al. | |
| 2015/0285662 A1* | 10/2015 | Nagura | G01D 5/38 250/231.1 |
| 2016/0003605 A1* | 1/2016 | Nakamura | G01B 9/02019 356/498 |
| 2016/0033257 A1* | 2/2016 | Meissner | G01B 9/02015 356/498 |

FOREIGN PATENT DOCUMENTS

| | | |
|---|---|---|
| JP | 2006349606 A | 12/2006 |
| JP | 2014153360 A | 8/2014 |
| JP | 2015087391 A | 5/2015 |

\* cited by examiner

POSITION DETECTION APPARATUS, FORCE SENSOR, AND APPARATUS

BACKGROUND OF THE INVENTION

Field of the Invention

The present invention relates to a position detection apparatus which detects a distance from an object to be measured.

Description of the Related Art

Japanese Patent Laid-open No. 2006-349606 discloses a gap sensor which measures a distance from an object to be measured by illuminating a light beam from an LED onto a reflection surface via a diffraction grating to receive reflected light on a light receiving element. The gap sensor disclosed in Japanese Patent Laid-open No. 2006-349606 uses fringes of a light intensity distributions that are formed by incoherent light transmitting through two diffraction gratings. By detecting a gap amount based on phase variations of the fringes of the light intensity distribution, it is possible to perform stable gap detection without depending on a light emitting amount of a light source.

Japanese Patent Laid-open No. 2005-326232 discloses a photoelectric encoder that uses a Doppler shift of light scattered by movement of a moving grating to calculate a displacement of the moving grating.

However, in a gap detection method disclosed in each of Japanese Patent Laid-open No. 2006-349606 and Japanese Patent Laid-open No. 2005-326232, there is a possibility that an error occurs in a detection value due to an inclination of the reflection surface, and thus it is difficult to perform gap detection (position detection) with high accuracy.

SUMMARY OF THE INVENTION

The present invention provides a position detection apparatus, a force sensor, and an apparatus which are capable of performing position detection with high accuracy.

A position detection apparatus as one aspect of the present invention illuminates light from a light source unit onto an object and that receives reflected light from the object on a light receiver to detect position information of the object, includes a detector including the light source unit and the light receiver and a signal processor configured to process a signal from the light receiver, the detector includes a first grating in an optical path between the light source unit and the object, a second grating in an optical path between the object and the light receiver, and a third grating in an optical path between the second grating and the light receiver, the light from the light source unit transmits through the first grating to form a first periodic image in an optical path between the first grating and the second grating, light corresponding to the first periodic image transmits through the second grating to form a second periodic image on the third grating, the signal processor acquires the position information of the object based on a phase variation of the second periodic image detected by the light receiver, and the position information of the object is information related to a distance from the detector to the object.

A force sensor as another aspect of the present invention includes a base member, a displacement member, an elastic supporting member provided between the base member and the displacement member to support the base member and the displacement member, and the position detection apparatus configured to detect an external force that acts on the displacement member depending on a displacement of the displacement member relative to the base member.

An apparatus as another aspect of the present invention includes a movable portion, the force sensor, and a controller configured to control the movable portion by using the force sensor.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Embodiment 1

Figure 1:
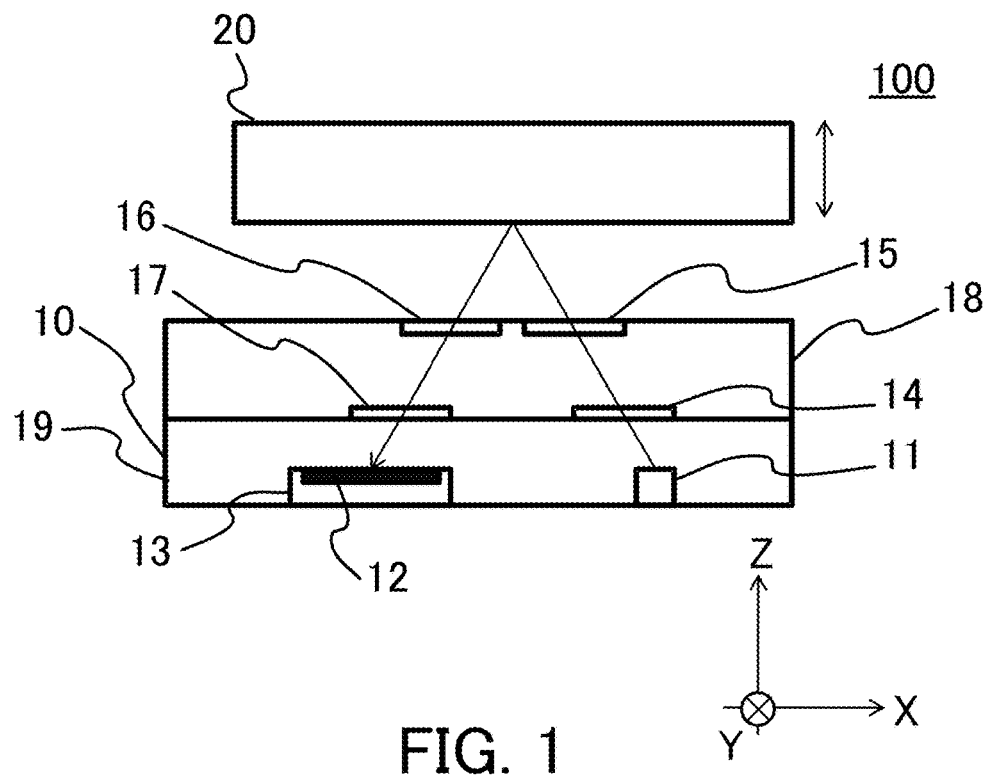
FIG. 1 is a cross-sectional view of an optical gap sensor in Embodiment 1.
Figure 2:
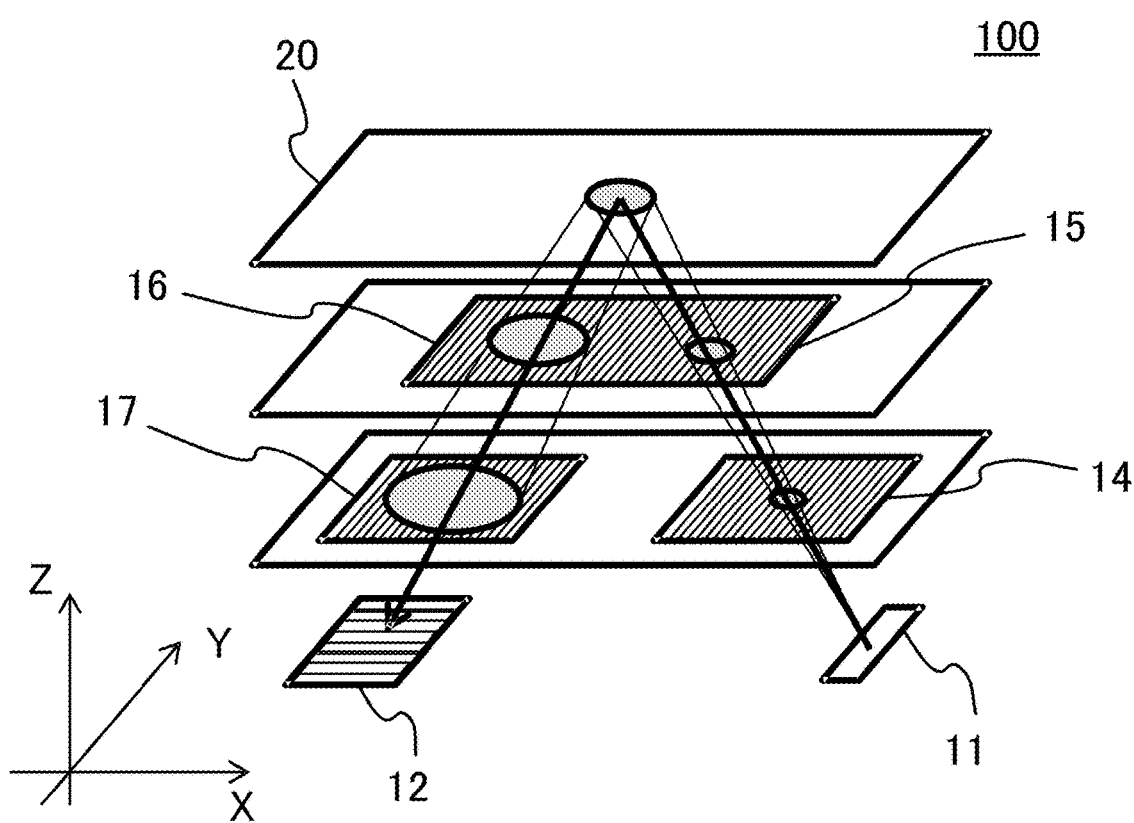
FIG. 2 is a perspective view of the optical gap sensor in Embodiment 1.

First, referring to FIGS. 1 and 2, a configuration of an optical gap sensor (position detection apparatus) in Embodiment 1 of the present invention will be described. FIG. 1 is a cross-sectional view of an optical gap sensor 100 in this embodiment. FIG. 2 is a perspective view of the optical gap sensor 100.

The optical gap sensor 100 includes a sensor unit 10 (detector) that is attached to a fixed portion and a reflector 20 that is attached to a movable portion, i.e., an object to be measured (not illustrated). In this embodiment, a relation between the fixed portion and the movable portion may be opposite to each other, and thus the sensor unit 10 can be attached to the movable portion and the reflector 20 can be attached to the fixed portion. In other words, the sensor unit 10 and the reflector 20 may be movable relative to each other (i.e., a distance between the sensor unit 10 and the reflector 20 may change in a Z direction in FIG. 1).

The sensor unit 10 is a sensor unit that includes a light emitting element 11 including a current confinement LED (i.e., light emitting diode including a current confinement structure or layer) and a light receiving IC 13 including a light receiving element array 12 (light receiver) which are mounted in a package. The light receiving element array 12 includes a plurality of light receiving elements that detect reflected light from the reflector 20. The reflector 20 has a flat surface facing the sensor unit 10, and it acts as an optical reflection surface. A surface of the reflector 20 can be coated with aluminum, gold, chromium, or the like to improve light utilization efficiency. In this embodiment, a glass surface, a metal surface, or the like of the reflector 20 can be directly used as a reflection surface.

In an optical path from the light emitting element 1 to the reflector 20 (i.e., optical path between the light emitting element 11 and a first grating 15), a light source grating 14 that includes a light source pattern (periodic transmittance) including light transmitting parts and light shielding parts (non-transmitting parts) that are alternately arrayed. The light source grating 14 includes opening arrays extending in a direction (i.e., Y direction in FIG. 1) orthogonal to a reflection surface of the reflector 20 and an incident surface of a principal ray. In this configuration, the light source grating 14 converts the light from the light emitting element 11 into light as a linear array light source. In this embodiment, a grating pitch (grating period P1) of the light source grating 14 is 8 μm. In this embodiment, the light emitting element 11 and the light source grating 14 constitute a light source unit.

In an optical path from the light source grating 14 to the reflector 22, a first grating 15 that is formed as a transmissive phase grating by concave parts and convex parts which are alternately arrayed is provided. The first grating 15 includes a groove array (concavo-convex array) extending in the Y direction, and a grating pitch (grating period P2) of the first grating 15 is 8 μm. An optical path length difference between the concave part and the convex part is around a half wavelength of a light source wavelength, and it is designed so that ±1st order diffracted light is maximized.

In an optical path after the reflection by the reflector 20 toward the light receiving element array 12 (i.e., optical path between the reflector 20 and the light receiving element array 12), a second grating 16 that is formed as a transmissive phase grating by concave parts and convex parts which are alternately arrayed is provided. Similarly to the first grating 15, the second grating 16 includes a groove array (concavo-convex array) extending in the Y direction, and a grating pitch (grating period P3) of the second grating 16 is 8 μm. An optical path length difference between the concave part and the convex part is around a half wavelength of the light source wavelength, and it is designed so that ±1st order diffracted light is maximized. At least one of the first grating 15 and the second grating 16 is a phase modulation type optical grating where an optical path length of transmitted light periodically varies.

In an optical path from the second grating 16 to the light receiving element array 12, an index grating 17 (third grating) is provided. The index grating 17 is formed as a transmissive grating constituted by light transmitting parts and light shielding parts that are alternately arrayed. The index grating 17 is approximately parallel to the Y direction, while it includes an opening array that is rotated by a minute angle around a Z axis. A grating pitch (grating period P4) of the index grating 17 is 8 μm.

The light source grating 14, the first grating 15, the second grating 16, and the index grating 17 are provided on a cover glass 18. The cover glass 18 provided with each grating is stuck to a transmissive resin 19 that seals the light emitting element 11 and the light receiving IC 13, and it is optically integrated with the light emitting element 11 and the light receiving IC 13. Each of the light source grating 14 and the index grating 17 is provided by forming a chromium film as a light shielding part on a surface (upper surface of the cover glass 18 in FIG. 1) of the cover glass 18. Each of the first grating 15 and the second grating 16 is provided by fabricating a concavo-convex pattern by etching processing on the other surface (lower surface of the cover glass 18 in FIG. 1) of the cover glass 18. Each of the first grating 15 and the second grating 16 may be a grating which includes light transmitting parts and light shielding parts that are alternately arrayed. Alternatively, the cover glass 18 may be formed by manufacturing a cover glass (first cover glass) that includes the light source grating 14 and the index grating 17 and a cover glass (second cover glass) that includes the first grating 15 and the second grating 16 separately and then sticking the first cover glass to the second cover glass.

The light source grating 14 and the index grating 17, and the first grating 15 and the second grating 16 do not need to be arranged on a plane (i.e., on the same plane). When each grating is arranged on the same plane, it is possible to perform patterning collectively on a glass surface with high flatness and accordingly a manufacturing cost or an assembling cost can be reduced. The first grating 15 and the second grating 16 can be designed similarly with each other, and at least a part of them can be commonized. In this case, the first grating 15 and the second grating 16 are integrally formed on the same plane. Similarly, parts of the light source grating 14 and the index grating 17 can be commonized. In this case, it is possible to simplify a ray path (optical path) and alignment (positioning) of each grating region.

Figure 3A:
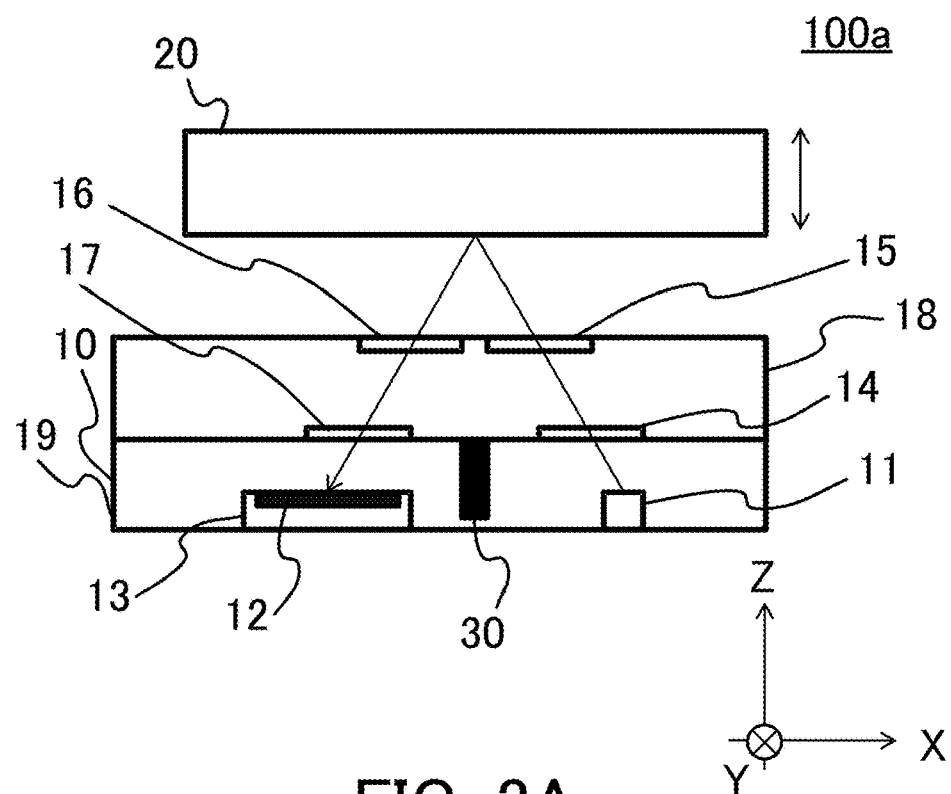
FIGS. 3A and 3B are cross-sectional views of optical gap sensors as modifications in Embodiment 1.
Figure 3B:
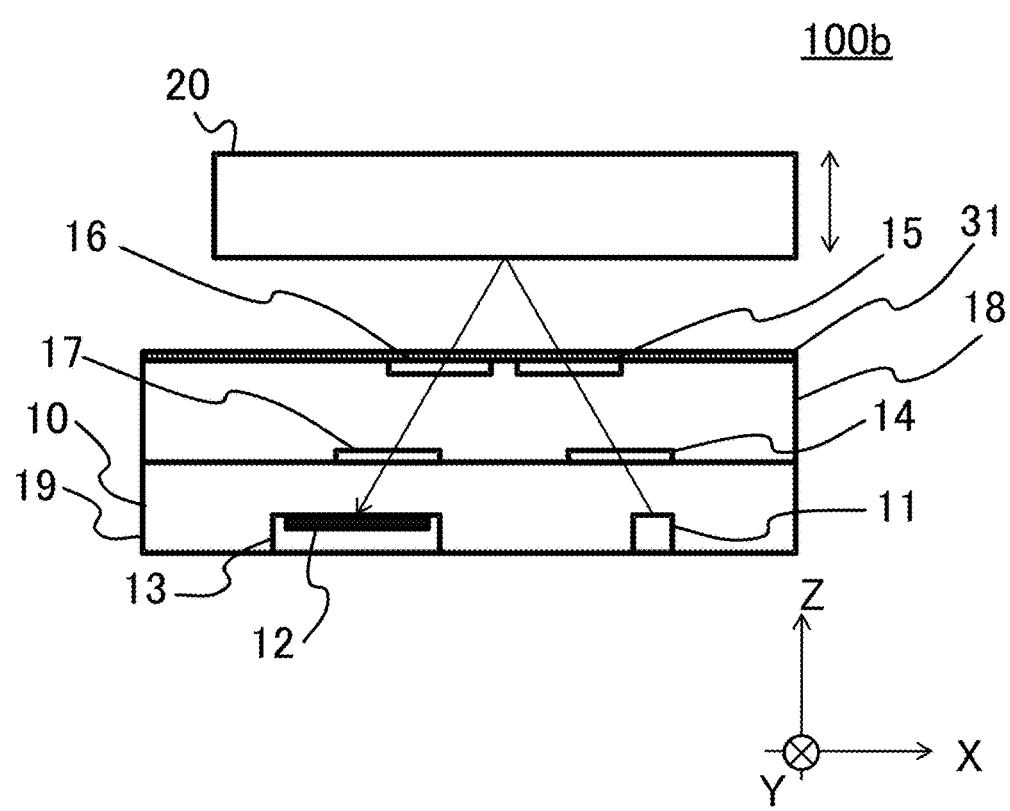

FIGS. 3A and 3B are cross-sectional views of optical gap sensors 100a and 100b, respectively, as modifications in this embodiment. As illustrated in FIG. 3A, the optical gap sensor 100a that is provided with a light shielding member 30 between the light emitting element 11 and the light receiving IC 13 in the sensor unit 10 may be used. The light shielding member 30 can suppress the incidence of the light reflected inside the sensor unit 10 without through the reflector 20 (for example, light from the light source grating 14 or the index grating 17 by internal reflection on its surface at the light source side). In this configuration, a contrast of an output signal from the light receiving element array 12 can be improved. As illustrated in FIG. 3B, the optical gap sensor 100b that is provided with an antireflection film 31 on an outer surface of the cover glass 18 at the scale side may be used. In this configuration, unnecessary reflected light can be reduced and a deterioration of accuracy of the output signal from the light receiving element array 12 can be reduced.

Figure 4:
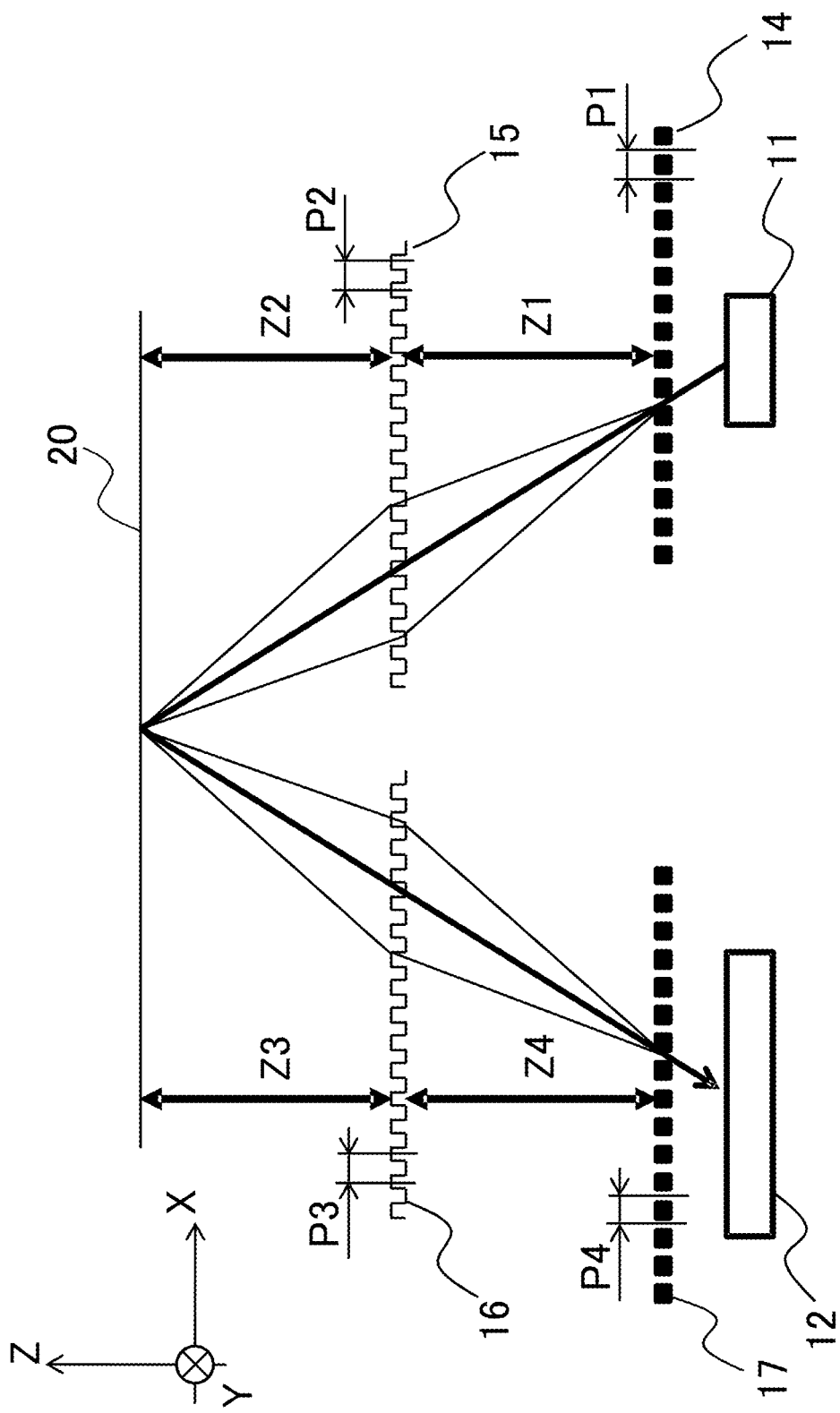
FIG. 4 is a schematic diagram of illustrating an optical arrangement of the optical gap sensor in Embodiment 1.

Next, referring to FIG. 4, an effect of the optical gap sensor 100 will be described. FIG. 4 is a schematic diagram of illustrating an optical arrangement of the optical gap sensor 100. An effective optical distance from the light source grating 14 to the first grating 15 is denoted by Z1, an optical distance from the first grating 15 to the reflection surface is denoted by Z2, an optical distance from the reflection surface to the second grating 16 is denoted by Z3, and an effective optical distance from the second grating 16 to the index grating 17 is denoted by Z4. The optical distance (effective optical distance) means a value that is obtained by dividing a physical length by a refractive index. Each of the optical distances Z2 and Z3 varies depending on a gap between the first grating 15 or the second grating 16 and the reflector 20 (reflection surface), while the optical gap sensor 100 is designed to satisfy Z1=Z2=Z3=Z4 around the center of a gap detection range.

Divergent light beams emitted from an LED as the light emitting element 11 pass through the light source grating 14 to form a light source array including a plurality of secondary point light sources that are incoherent each other. The divergent light beams emitted from the light source grating 14 enters the first grating 15. While this embodiment forms the secondary point light sources by the combination of the light emitting element 11 (LED) and the light source grating 14 (light source unit including the light emitting element 11 and the light source grating 14), it is not limited thereto. As the light source unit, without using the light source grating 14, a current confinement LED (light emitting diode including a current confinement structure or layer), a semiconductor laser (laser diode), or the like may be used as the effective point light source instead of the light emitting element 11.

The +1st order diffracted light and the −1st order diffracted light that are diffracted by the first grating 15 interfere with each other at the vicinity of the reflector 20. As a result, a first periodic image (a first periodic light pattern) that has a light intensity distribution with a constant period is formed. A condition of P1=P2=P3=P4=8 μm is satisfied where P1 is a grating period of the light source grating 14, P2 is a grating period of the first grating 15, and P3 is a grating period of the second grating 16. A distance $Z_{im1}$ from the first grating 15 to a first imaging plane of the first periodic image and a period $P_{im1}$ of the first periodic image on the first imaging plane are represented by expressions (1) and (2) below, respectively.

$$Z_{im1} = \frac{Z_1}{N\frac{P_1}{P_2} - 1} \quad (1)$$

$$P_{im1} = P_1 \cdot \frac{Z_{im1}}{Z_1} \quad (2)$$

In expression (1), N indicates an order of interference, and N=2 is an effective signal component since the ±1st order diffracted light is used in this embodiment.

The first periodic image acts as a tertiary light source array. The divergent light beam from the first periodic image enters the second grating 16 in a return path from the reflector 20. The +1st order diffracted light and the −1st order diffracted light that are diffracted by the second grating 16 interfere with each other at the vicinity of the index grating 17. As a result, a second periodic image (a second periodic light pattern) having a light intensity distribution with a constant period is formed. A distance $Z_{im2}$ from the second grating 16 to a second imaging plane of the second periodic image and a period $P_{im2}$ of the second periodic image on the second imaging plane are represented by expressions (3) and (4) below, respectively.

$$Z_{im2} = \frac{Z_2 + Z_3 - Z_{img1}}{N\frac{P_{im1}}{P_3} - 1} \quad (3)$$

$$P_{im2} = P_{im1} \cdot \frac{Z_{im2}}{Z_2 + Z_3 - Z_{im1}} \quad (4)$$

According to expression (1), $Z_{im1}$=Z1=Z2 is satisfied, and the first imaging plane coincides with the reflection surface. According to expression (2), $P_{im1}$=P1=8 μm is satisfied. According to expression (3), $Z_{im2}$=Z3=Z4 is satisfied, and the second periodic image is formed on a surface of the index grating 17. According to expression (4), $P_{im2}$=8 μm is satisfied. These are satisfied on the condition near the center of the gap detection range (Z1=Z2=Z3=Z4), and a period and a central phase of the light intensity distribution that is formed on a surface of the index grating 17 vary depending on a gap change (i.e., change of Z2 or Z3). In this embodiment, the center phase is detected by using the index grating 17 to detect a gap amount as follows.

The index grating 17 has a period that is approximately equal to that of the second periodic image. However, the index grating 17 is arranged to be slightly inclined by rotation around a Z axis. A moire fringe that is approximately orthogonal to a grating periodic direction of the index grating 17 is generated depending on the inclination amount. Then, an intensity distribution of the moire fringe is received by the light receiving element array 12, and a phase is calculated based on an output signal from the light receiving element array 12.

Figure 5:
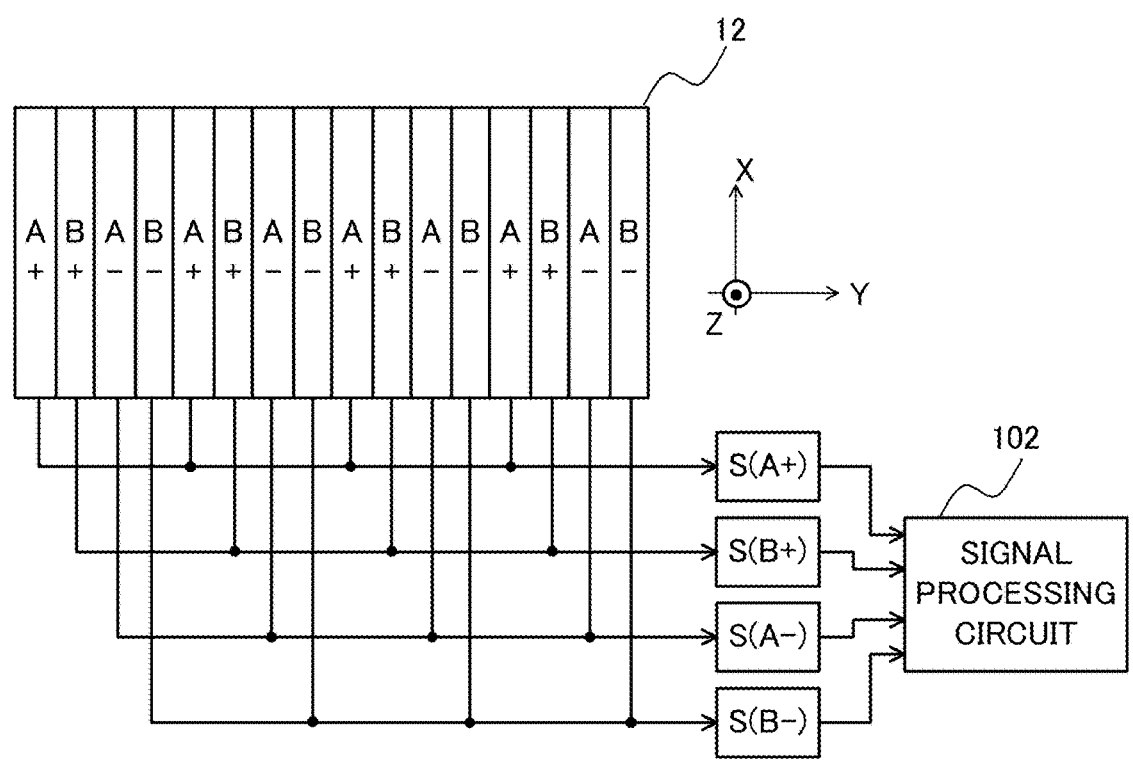
FIG. 5 is an array diagram of light receiving elements of a light receiving element array in each embodiment.

Next, referring to FIG. 5, an array of light receiving elements of the light receiving element array 12 will be described. FIG. 5 is an array diagram of the light receiving elements of the light receiving element array 12. The light receiving element array 12 includes 16 light receiving elements that have widths in the Y direction equal to each other and that are arranged at equal intervals in the Y direction, and the light receiving elements corresponding to four phases of A+, B+, A−, and B− are arrayed in a row as four combinations. A length of the light receiving elements of the four phases of A+, B+, A−, and B− is designed to be around a period of the moire fringe. Output signals of the light receiving elements corresponding to each phase are combined to be output as four phase analog electric signals S(A+), S(B+), S(A−) and S(B−) to a signal processing circuit 102 (signal processor).

The signal processing circuit 102 performs a differential calculation that is represented by expressions (5) and (6) below to remove an in-phase noise and a direct current component.

$$S(A)=S(A+)-S(A-) \quad (5)$$

$$S(B)=S(B+)-S(B-) \quad (6)$$

Furthermore, the signal processing circuit 102 performs calculation represented by expression (7) below by using the signals S(A) and S(B) to acquire a phase signal Φ.

$$\Phi = A\ \text{TAN}\ 2[S(A),S(B)] \quad (7)$$

In expression (7), A TAN 2[Y,X] indicates an arctangent operation function that determines a quadrant to be converted into a phase of 0 to 2π. Differences of the phase signals Φ at respective detection timings are integrated to be multiplied by a predetermined coefficient, and thus it is converted into a gap displacement amount Z. In this case, processing of correcting linearity and sensitivity can be performed to improve an accuracy. As a correction method, a method of comparing with a standard used for calibration and storing a correction value may be used, or alternatively a gap design value for a detection center may be set to Z0 to perform the conversion using Z'=Z0/Z.

Figure 6A:
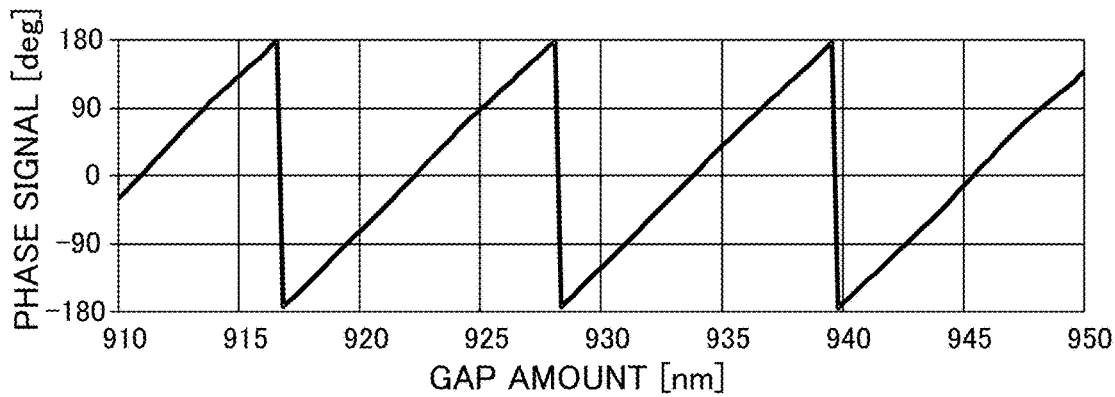
FIGS. 6A to 6C are graphs of illustrating changes of phase signals $\Phi$ with respect to gap amounts of the optical gap sensor in Embodiment 1.
Figure 6B:
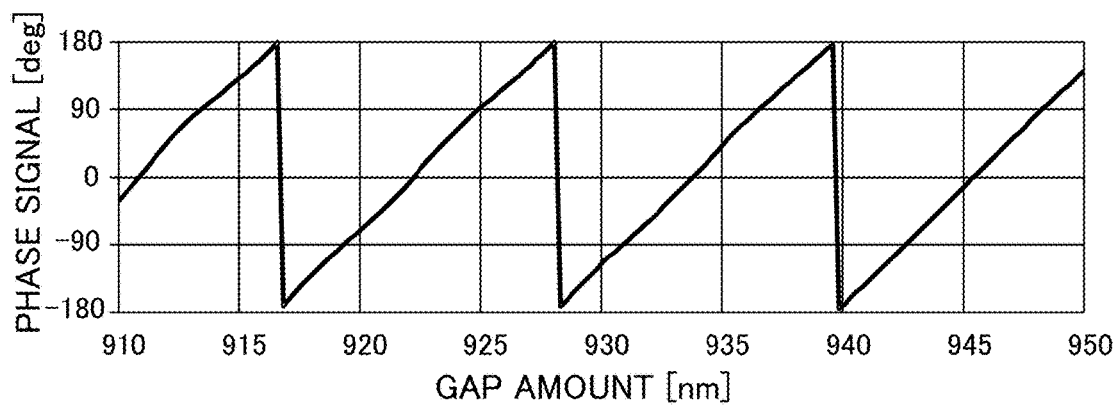
Figure 6C:
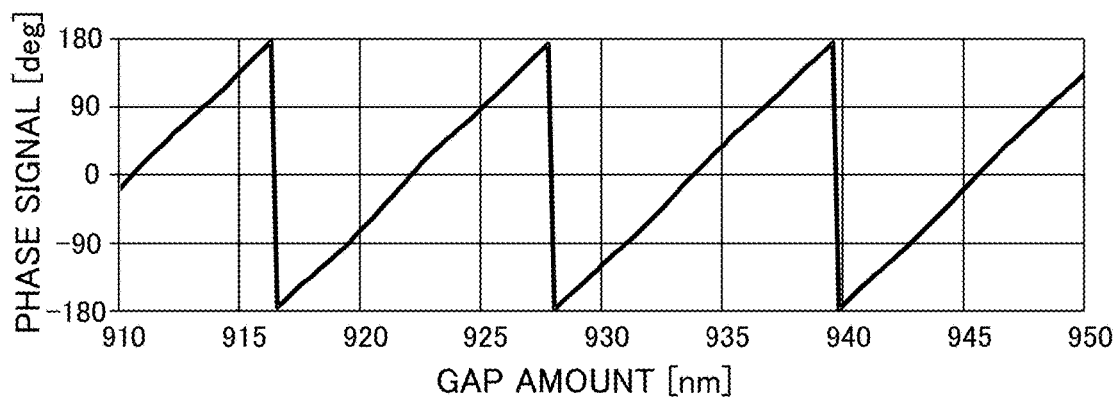

Next, referring to FIGS. 6A to 6C, a waveform of the phase signal Φ that is obtained according to expression (7) will be described. FIGS. 6A to 6C are graphs of illustrating changes of the phase signal Φ with respect to the gap amount of the optical gap sensor 100. In each of FIGS. 6A to 6C, a horizontal axis indicates a gap amount, and a vertical axis indicates a phase signal.

FIG. 6A illustrates a change of the phase signal Φ with respect to the gap amount when a wavelength of the light emitted from the light emitting element 11 is 650 nm. It can be seen that the phase signal Φ varies depending on the change of the gap amount and that the gap amount is detectable. FIG. 6B illustrates a change of the phase signal Φ with respect to the gap amount when the wavelength of the light emitted from the light emitting element 11 is 650 nm and the reflector 20 (object) is inclined by 0.1 degree around the Y axis. A rotation center of the inclination is assumed to be a principal ray position on the reflection surface (object surface). Compared to FIG. 6A, it can be seen that the relationship between the phase signal Φ and the gap amount does not substantially change and that the influence of the inclination of the reflection surface is extremely small. According to this embodiment, a light source image is imaged (i.e., reimaged) in an optical path to form the first imaging plane near the reflection surface, and thus the influence of the inclination of the reflection surface can be reduced. This is in contrast to conventional arts (for example, Japanese Patent Laid-open No. 2006-349606) where the detected value varies depending the inclination of the reflection surface.

FIG. 6C illustrates a change of the phase signal Φ with respect to the gap amount when the wavelength of the light emitted from the light emitting element 11 is 850 nm and the inclination of the reflector 20 is 0 degree. Compared to FIG. 6A, it can be seen that the relationship between the phase signal Φ and the gap amount does not substantially change and that the influence of the variation of the wavelength is extremely small. Thus, this embodiment does not indicate wavelength dependence and it cap perform stable gap detection with respect to a temperature change. Conventional arts (for example, Japanese Patent Laid-open No. 2005-326232) uses interference of two light beams of special coherent light beams (for example, collimated laser light beams). In this case, however, an amount of the phase change of a grating image according to the gap variation depends on (i.e., is inversely proportional to) the wavelength. This causes a variation of a measured value when the wavelength varies due to a variation of an environmental temperature.

As described above, the position detection apparatus (optical gap sensor 100) of this embodiment illuminates light from the light source unit onto the object (reflector 20) and receives reflected light from the object on the light receiver (light receiving element array 12) to detect position information of the object. The position detection apparatus includes the detector (sensor unit 10) including the light source unit and the light receiver, and the signal processor (signal processing circuit 102) processes a signal from the light receiver. The detector includes the first grating 15 provided in an optical path between the light source unit and the object, the second grating 16 provided in an optical path between the object and the light receiver, and the third grating (index grating 17) provided in an optical path between the second grating and the light receiver. The light from the light source unit transmits through the first grating to form the first periodic image in an optical path between the first grating and the second grating. The light corresponding to the first periodic image transmits through the second grating to form the second periodic image on the third grating. The signal processor acquires the position information of the object based on the phase variation of the second periodic image detected by the light receiver. The position information of the object is information related to a distance from the detector to the object, i.e., a change (variation) of a distance from the detector to the object. In other words, the position information is information related to a distance (or a change of the distance) between the object and the detector in a direction perpendicular to a light reflection surface of the object or in a direction perpendicular to at least one of the first, second, and third gratings.

According to this embodiment, a high-accuracy position detection apparatus (gap sensor) that is not easily affected by warpage or inclination of an object can be achieved.

Embodiment 2

Figure 7:
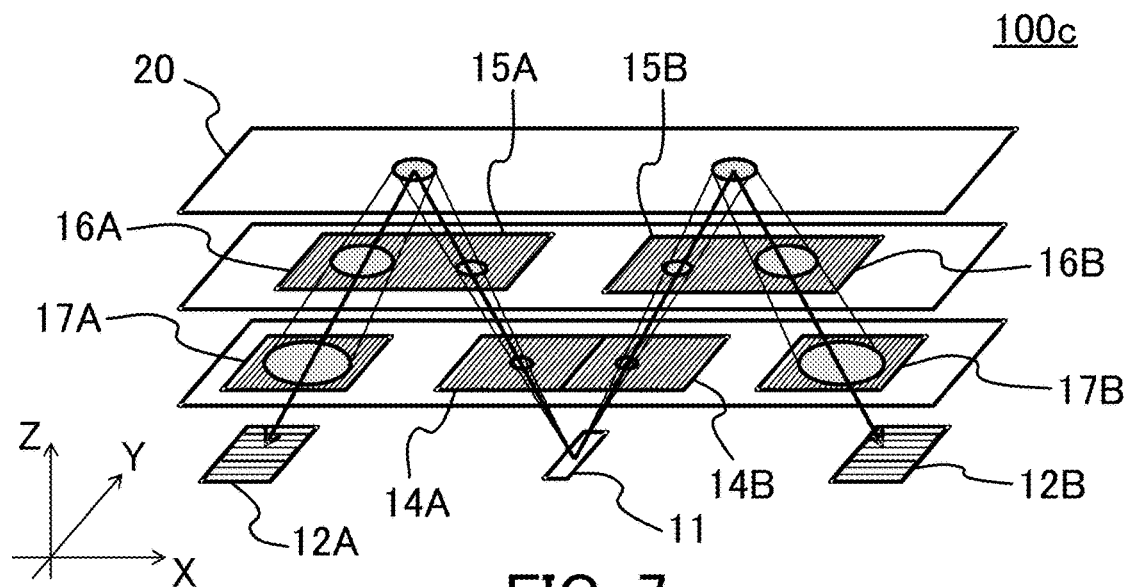
FIG. 7 is a perspective view of an optical gap sensor in Embodiment 2.

Next, referring to FIG. 7, an optical gap sensor (position detection apparatus) in Embodiment 2 of the present invention will be described. FIG. 7 is a perspective view of an optical gap sensor 100c in this embodiment, and it illustrates an example of performing biaxial direction. The sensor unit 10 of this embodiment, in addition to the configuration of the sensor unit 10 of Embodiment 1, includes the similar optical configuration at an opposed position with respect to the light emitting element 11 (i.e., along the X direction).

In FIG. 7, with respect to a first optical configuration on the left side of the light emitting element 11, a first gap amount Z1 at a first optical path illumination position X1 on the reflector 20 is detected via a first optical path. The first optical path is an optical path from the light emitting element 11 toward a light source grating 14A, a first grating 15A, the reflector 20, a second grating 16A, an index grating 17A (third grating), and a light receiving element array 12A (light receiver). With respect to a second optical configuration on the right side of the light emitting element 11, a second gap amount Z2 at a second optical path illumination position X2 on the reflector 20 is detected via a second optical path. The second optical path is an optical path from the light emitting element 11 toward a light source grating 14B, a fourth grating 15B, the reflector 20, a fifth grating 16B, an index grating 17B (sixth grating), and a light receiving element array 12B (light receiver). A method of detecting the gap amount is similar to that of Embodiment 1, and accordingly descriptions thereof are omitted.

As described above, the sensor unit (detector) of this embodiment includes the fourth grating 15B, the fifth grating 16B, and the index grating 17B (sixth grating) in addition to each element of the sensor unit 10 of Embodiment 1. The fourth grating 15B is provided in an optical path between the light source unit (the light emitting element 11 and the light source grating 14B) and the object (reflector 20). The fifth grating 16B is provided in an optical path between the reflector 20 and the light receiving element array 12B (light receiver). The index grating 17B is provided in an optical path between the fifth grating 16B and the light receiving element array 12B. The light from the light source unit transmits through the fourth grating 15B to form a third periodic image in an optical path between the fourth grating 15B and the fifth grating 16B. Light corresponding to the third periodic image transmits through the fifth grating 16B to form a fourth periodic image on the index grating 17B. The signal processor (signal processing circuit 102) acquires the position information of the reflector 20 based on a phase variation of the fourth periodic image detected by the light receiving element array 12B.

In this embodiment, a rotation amount θy around the Y axis can be detected by using the first optical path illumination position X1, the second optical path illumination position X2, the first gap amount Z1, and the second gap amount Z2 as represented by expression (8) below.

$$\theta y = A\ \text{TAN}\ \{(Z2-Z1)/(X2-X1)\} \tag{8}$$

By performing approximation under a condition of θy<<1, the rotation amount θy around the Y axis is represented by expression (9) below.

$$\theta y = (Z2-Z1)/(X2-X1) \tag{9}$$

As described above, an integrated sensor unit that detects a rotation amount as well as a gap amount can be achieved.

Embodiment 3

Figure 8:
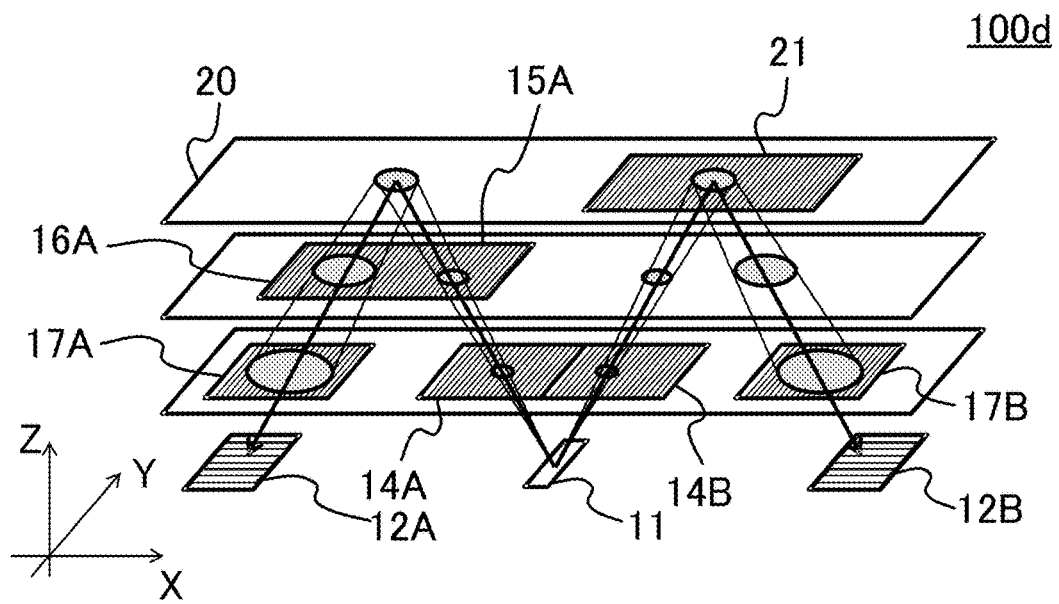
FIG. 8 is a perspective view of an optical gap sensor in Embodiment 3.

Next, referring to FIG. 8, an optical gap sensor (position detection apparatus) in Embodiment 3 of the present invention will be described. FIG. 8 is a perspective view of an optical gap sensor 100d in this embodiment, and it illustrates an example of performing biaxial direction. The sensor unit 10 of this embodiment, in addition to the configuration of the sensor unit 10 of Embodiment 1, includes an optical configuration for position detection in the X direction at an opposed position with respect to the light emitting element 11 (i.e., along the X direction).

In FIG. 8, with respect to an optical configuration on the left side of the light emitting element 11, a gap amount Dl at a first optical path illumination position X1 on the reflector 20 is detected via a first optical path. The first optical path is an optical path from the light emitting element toward the light source grating 14A, the first grating 15A, the reflector 20, the second grating 16A, the index grating 17A (third grating), and the light receiving element array 12A (light receiver). A method of detecting the gap amount is similar to that of Embodiment 1, and accordingly descriptions thereof are omitted.

An optical configuration on the right side of the light emitting element 11 performs position detection in the X direction. In FIG. 8, with respect to the optical configuration on the right side of the light emitting element 11, in an optical path from the light emitting element 11 toward the reflector 20, a light source grating 14B including light transmitting parts and light shielding parts that are alternately arrayed is provided. The light source grating 14B includes opening arrays extending in a direction (i.e., Y direction in FIG. 8) orthogonal to a reflection surface of the reflector 20 and an incident surface of a principal ray. A grating pitch of the light source grating 14B is 8 µm. The reflector 20 is provided with a reflective phase grating 21 including concave parts and convex parts that are alternately arrayed in an area where light beams from the light source grating 14B are illuminated. The phase grating 21 includes a groove array (concavo-convex array) extending in the Y direction, and a grating pitch of the phase grating 21 is 8 µm. An optical path length difference between the concave part and the convex part is around a half wavelength of a light source wavelength for a double path, and it is designed so that ±1st order diffracted light is maximized.

In an optical path from the phase grating 21 to the light receiving element array 12B (light receiver), an index grating 17B (seventh grating) is provided. The index grating 17B is formed as a transmissive grating constituted by light transmitting parts and light shielding parts that are alternately arrayed. The index grating 17B is approximately parallel to the Y direction, while it includes an opening array that is rotated by a minute angle around the Z axis. A grating pitch of the index grating 17B is 8 µm.

Divergent light beams emitted from the light emitting element 11 (LED) pass through the light source grating 14B to form a light source array including a plurality of secondary point light sources that are incoherent each other. The divergent light beams emitted from the light source grating 14B enters the six grating 21 on the reflector 20.

As described above, the sensor unit (detector) of this embodiment includes the index grating 17B (seventh grating) where the reflected light from the phase grating 21 provided in a predetermined area of the object (reflector 20) in addition to each element of the sensor unit 10 of Embodiment 1. Light from the light source unit (the light emitting element and the light source grating 14B) is reflected by the phase grating 21, and then it transmits through the index grating 17B to be received by the light receiving element array 12B (light receiver). The signal processor (signal processing circuit 102) acquires position information (displacement information) in a direction (X direction) perpendicular to a direction (Z direction) of a distance from the detector to the reflector 20 based on a detection signal of the light receiving element array 12B.

The +1st order diffracted light and the −1st order diffracted light that are diffracted and reflected by the phase grating 21 interfere with each other on the index grating 17B. As a result, an interference fringe having a light intensity distribution with a period of 8 µm is formed. The index grating 17B is arranged to be slightly inclined with respect to the interference fringe, and a moire fringe that is approximately orthogonal to a grating periodic direction of the index grating 17B is generated depending on the inclination amount. An intensity distribution of the moire fringe is received by the light receiving element array 12B, and a phase can be calculated based on a detection signal (output signal) of the light receiving element array 12B. The configuration of the light receiving element array 12B and the phase calculation are similar to the case of the gap detection in Embodiment 1, and accordingly descriptions thereof are omitted. The phase signal is a periodic signal that changes depending on a movement of the reflector 20 in the X direction. Since the interference of the +1st order diffracted light and the −1st order diffracted light is used, the phase changes by 2π with a movement amount of a half of the grating pitch of 8 µm of the sixth grating 21. In this configuration, according to this embodiment, it is possible to perform biaxial detection in the Z direction and the X direction.

Embodiment 4

Figure 9:
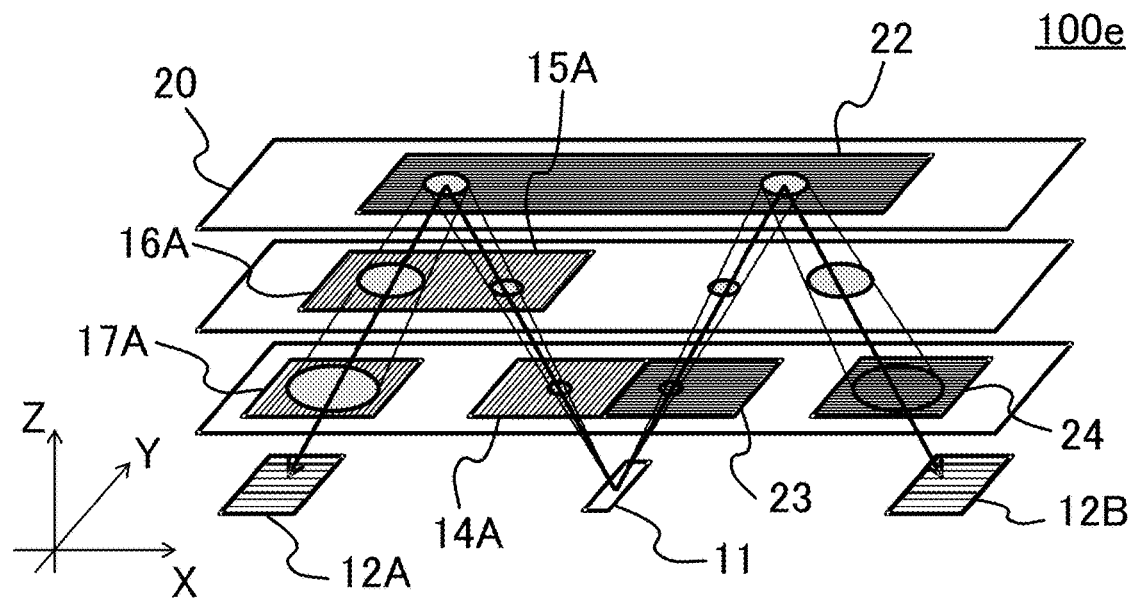
FIG. 9 is a perspective view of an optical gap sensor in Embodiment 4.

Next, referring to FIG. 9, an optical gap sensor (position detection apparatus) in Embodiment 4 of the present invention will be described. FIG. 9 is a perspective view of an optical gap sensor 100e in this embodiment, and it illustrates an example of performing biaxial direction. The sensor unit 10 of this embodiment, in addition to the configuration of the sensor unit 10 of Embodiment 1, includes an optical configuration for position detection in the Y direction at an opposed position with respect to the light emitting element 11 (i.e., along the X direction).

In FIG. 9, with respect to an optical configuration on the left side of the light emitting element 11, a gap amount Dl at a first optical path illumination position X1 on the reflector 20 is detected via a first optical path. The first optical path is an optical path from the light emitting element toward the light source grating 14A, the first grating 15A, the reflector 20, the second grating 16A, the index grating 17A (third grating), and the light receiving element array 12A (light receiver). A method of detecting the gap amount is similar to that of Embodiment 1, and accordingly descriptions thereof are omitted.

An optical configuration on the right side of the light emitting element 11 performs position detection in the Y direction. In FIG. 9, with respect to the optical configuration on the right side of the light emitting element 11, in an optical path from the light emitting element 11 toward the reflector 20, a light source grating 23 including light transmitting parts and light shielding parts that are alternately arrayed is provided. The light source grating 23 includes opening arrays extending in a direction (i.e., X direction in FIG. 9) parallel to an incident surface of a principal ray. A grating pitch of the light source grating 23 is 8 μm.

The reflector 20 is provided with a reflective phase grating 22 including concave parts and convex parts that are alternately arrayed in an illumination area where light beams from the light source gratings 23 and 14A are illuminated. The phase grating 22 includes a groove array (concavo-convex array) extending in the X direction, and a grating pitch of the phase grating 22 is 8 μm. An optical path length difference between the concave part and the convex part is around a half wavelength of a light source wavelength for a double path, and it is designed so that ±1st order diffracted light is maximized. In FIG. 9, the light beams for the gap detection on the left side of the light emitting element 11 is also reflected by the phase grating 22. In other words, light transmitting through the first grating 15A from the light source unit (the light emitting element 11 and the light source grating 14A) is reflected by the phase grating 22 of the object (reflector 20) to be incident on the second grating 16A. However, each of gratings (the light source grating 14A, the first grating 15A, the second grating 16A, and the index grating 17A) on the sensor side and the phase grating 22 are orthogonal to each other in a periodic direction of the grating, and accordingly a gap detection signal is not affected.

In an optical path from the phase grating 22 to the light receiving element array 12B (light receiver), an eighth grating 24 is provided. The eighth grating 24 is formed as a transmissive grating constituted by light transmitting parts and light shielding parts that are alternately arrayed. The eighth grating 24 includes an opening array that is arranged in parallel to the X direction. A grating pitch of the eighth grating 24 has a period that is slightly larger than 8 μm.

Divergent light beams emitted from the LED as the light emitting element 11 pass through the light source grating 23 to be a plurality of coherent light beams each other. Thus, a light source array including secondary point light sources is formed by the light emitting element 11 and the light source grating 23. The divergent light beams emitted from the light source grating 23 enters the eighth grating 22 on the reflector 20.

The +1st order diffracted light and the −1st order diffracted light that are diffracted and reflected by the phase grating 22 interfere with each other on the eighth grating 24. As a result, an interference fringe having a light intensity distribution with a period of 8 μm is formed. The eighth grating 24 has a period that is slightly larger than 8 μm as a period of the interference fringe, and thus a moire fringe is generated in the grating periodic direction of the eighth grating 24. An intensity distribution of the moire fringe is received by the light receiving element array 12B, and a phase is calculated based on an output signal of the light receiving element array 12B. The configuration of the light receiving element array 12B and the phase calculation are similar to the case of the gap detection in Embodiment 1, and accordingly descriptions thereof are omitted. The phase signal is a periodic signal that changes depending on a movement of the reflector 20 in the Y direction. Since the interference of the +1st order diffracted light and the −1st order diffracted light is used, the phase changes by 2π with a movement amount of a half of the grating pitch of 8 μm of the eighth grating 24. In this configuration, according to this embodiment, it is possible to perform biaxial detection in the Z direction and the Y direction.

Embodiment 5

Next, referring to FIGS. 10 and 11, an optical force sensor (six-axis force sensor) in Embodiment 5 of the present invention will be described. The optical force sensor of this embodiment includes the optical gap sensor 100e of Embodiment 4.

Figure 10:
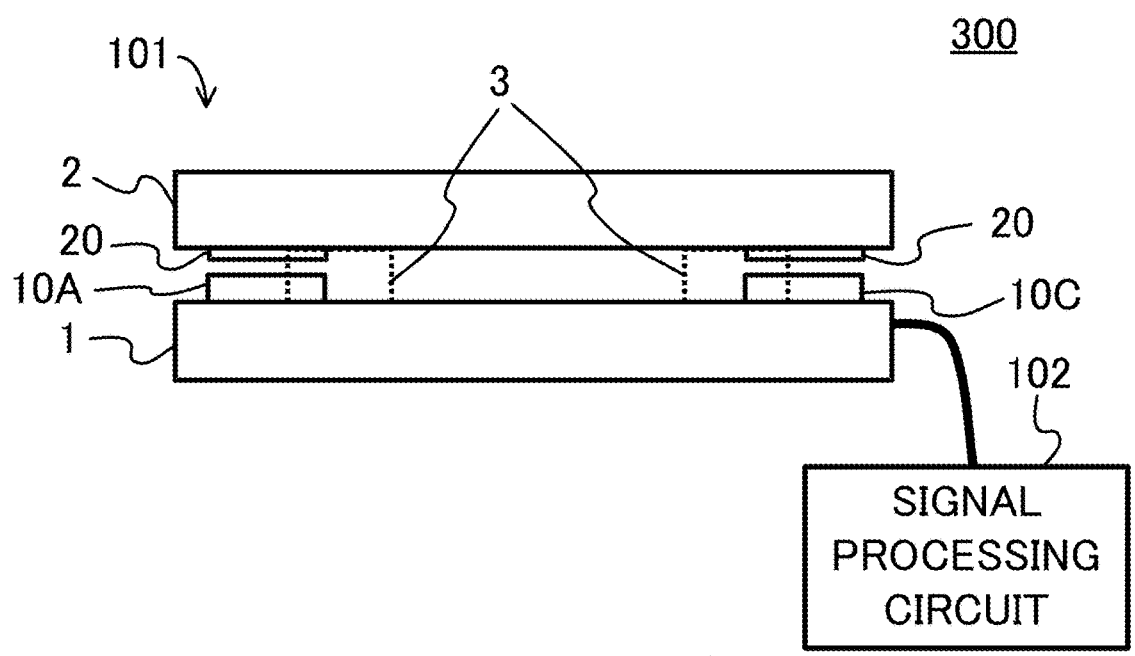
FIG. 10 is a perspective view of an optical force sensor in Embodiment 5.
Figure 11:
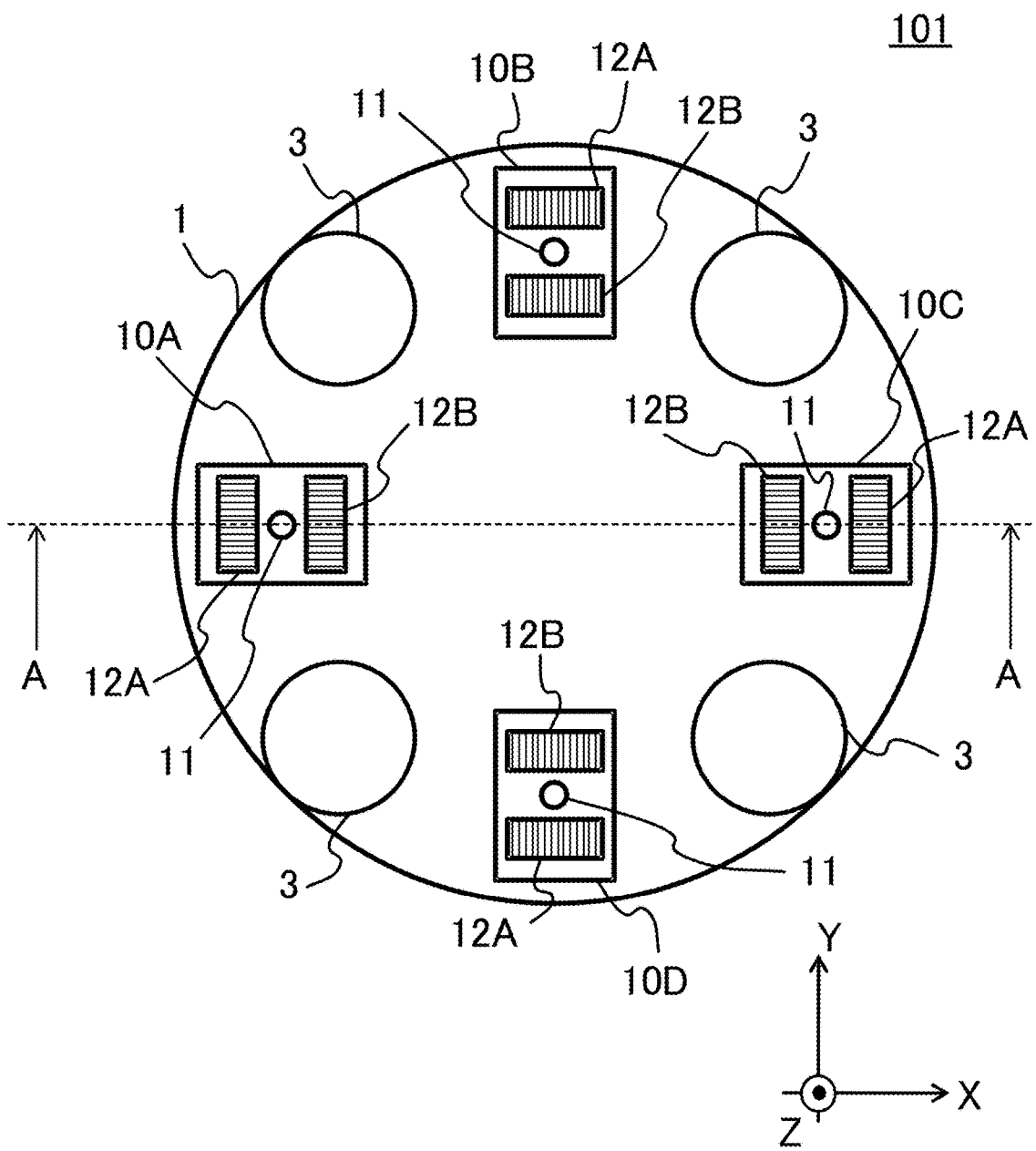
FIG. 11 is a sectional plan view of a force sensor unit of the optical force sensor in Embodiment 5.

FIG. 10 is a configuration diagram (sectional side view) of an optical force sensor 300 in this embodiment. FIG. 11 is a sectional plan view of a force sensor unit 101 of the optical force sensor 300. FIG. 10 is a cross-sectional view along a line A-A in FIG. 11.

The optical force sensor 300 includes the force sensor unit 101 and a signal processing circuit 102 (signal processor). The force sensor unit 101 outputs a displacement signal indicating a displacement, which is caused by an external force, of a displacement member described below that is provided inside the force sensor unit 101 to the signal processing circuit 102. The signal processing circuit 102 calculates a vector amount of the external force based on the input displacement signal to output the calculation result as a force signal.

The signal sensor unit 101 includes a base member 1, a displacement member 2, an elastic supporting member 3 (elastic member), and a displacement detector (optical gap sensor 100e including the sensor units 10A to 10D and the reflector 20). FIG. 11 illustrates a plan view of the base member 1, the elastic supporting member 3, and the sensor units 10A to 10D of the displacement detector 5, except the displacement member 2 and the reflector 20 of the force sensor unit 101.

Each of the base member 1 and the displacement member 2 has a disc shape. The base member 1 and the displacement member 2 are disposed to be separated from each other in a Z direction where a Z axis as a center axis of each of the circles extends, and they are connected by four elastic supporting members 3 each having a cylindrical shape that are disposed between the base member 1 and the displacement member 2. The displacement member 2 can perform a vertical displacement relative to the base member 1 in the Z direction while elastically deforming the elastic supporting members 3 according to the external force acting on the displacement member 2. Furthermore, the displacement member 2 can perform a parallel displacement relative to the base member 1 in a direction (second direction) along the X axis or the Y axis that is orthogonal to the Z axis, a rotational displacement in a direction around the X axis and the Y axis, and a rotational displacement around the Z axis.

The elastic supporting members 3 are disposed by 90 degrees (with intervals of 90 degrees with respect to a center axis of the circle) on a circumference. The sensor units 10A to 10D are disposed by 90 degrees on the circumference while they are shifted by 45 degrees from the elastic supporting members 3. Each of the sensor unit 10A to 10D, similarly to the sensor unit 10 of Embodiment 4, includes the light receiving element array 12A for gap detection and a light receiving element array 12B for translation detection.

A gap position detection value and a translation position detection value by the sensor unit 10A are denoted by $D_a$ and $X_a$, respectively. Similarly, a gap position detection value and a translation position detection value by the sensor unit 10B are denoted by $D_b$ and $X_b$, a gap position detection value and a translation position detection value by the sensor unit 10C are denoted by $D_c$ and $X_c$, and a gap position detection value and a translation position detection value by the sensor unit 10D are denoted by $D_d$ and $X_d$, respectively. In this case, the signal processing circuit 102 acquires displacements X, Y, and Z of the displacement member 2 in the X, Y, and Z-axis directions and rotation amounts θx, θy, and θz around the x, y, and z axes by a matrix operation represented by expression (10) below.

$$\begin{bmatrix} \theta x \\ \theta y \\ \theta z \\ X \\ Y \\ Z \end{bmatrix} = \begin{bmatrix} -1/2 & 0 & 1/2 & 0 & 0 & 0 & 0 & 0 \\ 0 & 1/2 & 0 & -1/2 & 0 & 0 & 0 & 0 \\ 0 & 0 & 0 & 0 & 1/4 & 1/4 & 1/4 & 1/4 \\ 0 & 1/2\alpha & 0 & -1/2\alpha & 1/2 & 0 & -1/2 & 0 \\ -1/2\beta & 0 & 1/2\beta & 0 & 0 & 1/2 & 0 & -1/2 \\ 1/4 & 1/4 & 1/4 & 1/4 & 0 & 0 & 0 & 0 \end{bmatrix} \begin{bmatrix} D_a \\ D_b \\ D_c \\ D_d \\ X_a \\ X_b \\ X_c \\ X_d \end{bmatrix} \quad (10)$$

In expression (10), symbols α and β are coefficients corresponding to sensitivities of change of the translation position detection value when the reflector 20 is inclined by the rotational amounts θx and θy. The coefficients α and β are determined by a design of the force sensor unit 101, and they can be geometrically calculated by design values such as distances from the light source grating 23 and the ninth grating 24 to the eighth grating 22 and a distance between the light emitting element 11 and the light receiving element array 12. Alternatively, the coefficients α and β may be determined by actual measurement. Thus, when performing in-plane displacement detection using the reflection diffraction grating (ninth grating 24), it is possible to remove a crosstalk component due to a variation of the inclination of the reflection surface.

According to the displacement of each axis obtained as described above, six-axis external forces of forces Fx, Fy, Fz applied to the displacement member 2 in the X, Y, and Z-axis directions, and moments Mx, My, and Mz around the X, Y, and Z axes are calculated. In other words, the external forces of the respective axes are approximately proportional to the displacements X, Y, and Z in the X, Y, and Z directions and the rotational amounts θx, θy, and θz around the x, y, and z axes. Accordingly, the external force of each axis is converted and acquired by multiplying the displacement or the rotational amount by the coefficient.

As described above, the force sensor (optical force sensor 300) of this embodiment includes the base member 1, the displacement member 2, and the elastic supporting member 3 provided between the base member 1 and the displacement member 2 to support the base member 1 and the displacement member 2. Furthermore, the force sensor includes the optical gap sensor (position detection apparatus) of each embodiment configured to detect the external force that acts on the displacement member 2 depending on the displacement of the displacement member relative to the base member 1.

This embodiment describes the case where the base member 1 is provided with the sensor units 10A to 10D of the displacement detector 5 and the displacement member 2 is provided with the reflector 20. Alternatively, the base member 1 may be provided with the reflector 20 and the displacement member 2 may be provided with the sensor units 10A to 10D. In other words, the detector can be provided on one of the base member or the displacement member 2 and the reflector 20 can be provided on the other member.

Embodiment 6

Figure 12:
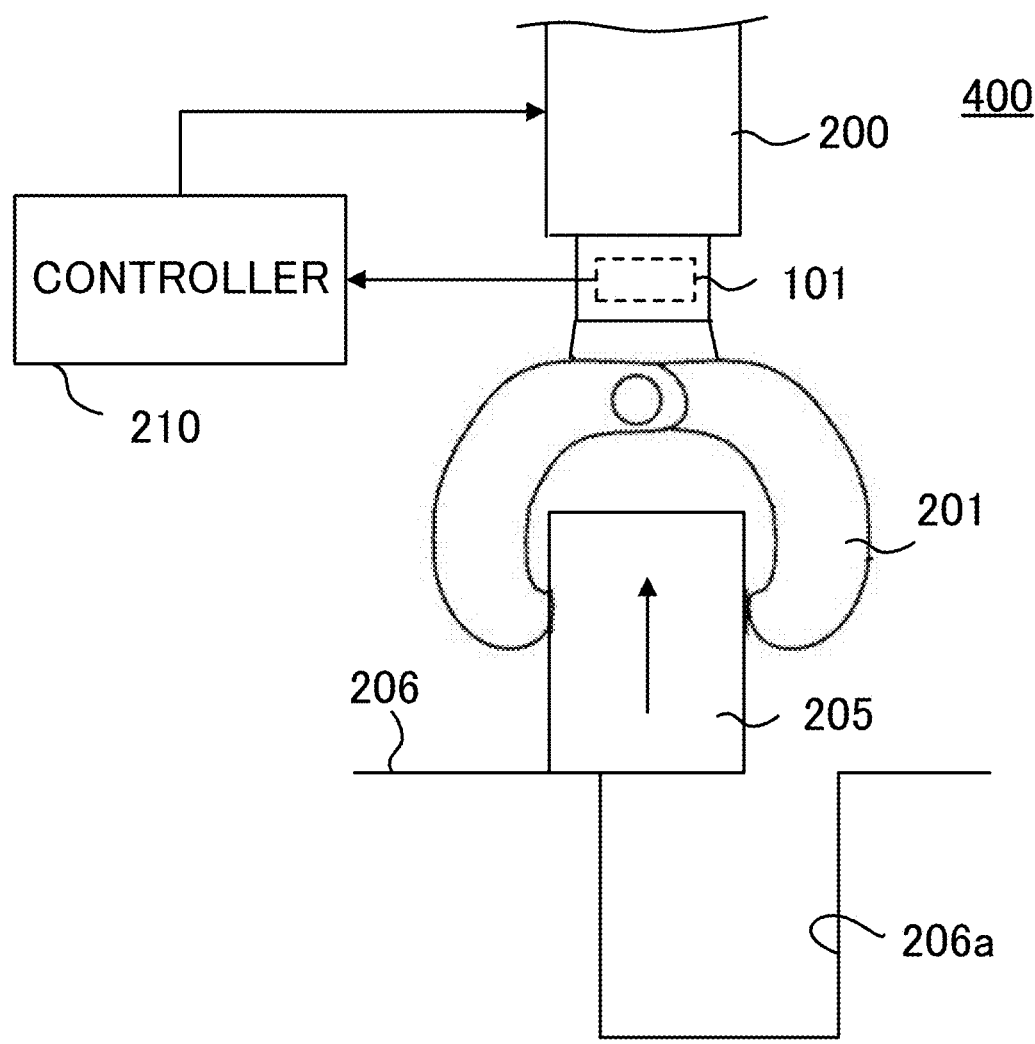
FIG. 12 is a configuration diagram of a robot arm transportation apparatus in Embodiment 6.

Next, referring to FIG. 12, a robot arm transportation apparatus in Embodiment 6 of the present invention will be described. FIG. 12 is a configuration diagram of a robot arm transportation apparatus 400 in this embodiment, and it illustrates the robot arm transportation apparatus 400 including the optical force sensor 300 described in Embodiment 5.

A robot arm 200 as a movable portion that can operate holds (grips) a conveyed object 205 by using a holding portion 201. The robot arm 200 is performing an operation to insert the conveyed object 205 into a hole 206a formed on a substrate 206, and its operation is controlled by a controller 210 such as a processor (CPU).

The robot arm 200 is provided with a force sensor unit 101 (optical force sensor 300) to detect an upward external force that the holding portion 201 receives from the substrate 206 via the conveyed object 205. When the conveyed object 205 contacts an area other than the hole 206a on the upper surface of the substrate 206, the external force acts on the force sensor unit 101 from the holding portion 201, and thus it is detected that a position of the conveyed object 205 is out of (i.e., displaced from) a position of the hole 206a. Accordingly, the controller 210 controls the operation of the robot arm 200 to move the conveyed object 205 along the upper surface of the substrate 206.

When the conveyed object 205 is located above the hole 206a, the external force that acts on the force sensor unit 101 from the holding portion 201 is eliminated, and thus it is detected that the position of the conveyed object 205 coincides with the position of the hole 206a. Accordingly, the controller 210 controls the operation of the robot arm 200 to insert the conveyed object 205 into the hole 206a.

As described above, an apparatus (robot arm transportation apparatus 400) of this embodiment includes the movable portion (holding portion 201), the force sensor (optical force sensor 300) described in Embodiment 5, and the controller 210 that controls the movable portion by using the force sensor. By using the optical force sensor 300 described in Embodiment 5 for the robot arm 200, it is possible to control the operation of the robot arm 200 with high accuracy. The optical force sensor 300 described in Embodiment 5 can be used for various apparatuses, other than the robot arm transportation apparatus 400 described in this embodiment, that control operations by using results of detection of external forces.

The position detection apparatus of each embodiment is not easily affected by an inclination of a reflection surface. Accordingly, each embodiment can provide a position detection apparatus, a force sensor, and an apparatus which are capable of performing position detection (gap detection) with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-049748, filed on Mar. 14, 2016, which is hereby incorporated by reference herein in its entirety.

What is claimed is:

1. A position detection apparatus that illuminates light from a light source unit onto an object and receives reflected light from the object on a light receiver to obtain position information of the object, the position detection apparatus comprising:
a detector including the light source unit and the light receiver; and
a signal processor configured to process a signal from the light receiver,
wherein the detector includes:
a first grating on an optical path between the light source unit and the object;
a second grating on an optical path between the object and the light receiver; and
a third grating on an optical path between the second grating and the light receiver,
wherein the light from the light source unit transmits through the first grating to form a first periodic image on an optical path between the first grating and the second grating,
wherein light corresponding to the first periodic image transmits through the second grating to form a second periodic image on the third grating,
wherein the signal processor is configured to acquire information related to a gap amount between the detector and the object based on a phase of a signal corresponding to light detected by the light receiver via the third grating, and
wherein the position detection apparatus comprises a part on the object, the light from the light source unit being incident on the part, the part having no grating in an incident plane of the light from the light source unit onto the object.

2. The position detection apparatus according to claim 1, wherein the light source unit includes a light emitting element and a light source grating on an optical path between the light emitting element and the first grating.

3. The position detection apparatus according to claim 2, wherein the light source grating has a periodic transmittance and is configured to convert light from the light emitting element into diffracted light.

4. The position detection apparatus according to claim 1, wherein the light source unit includes a light emitting diode including a current confinement structure or a semiconductor laser.

5. The position detection apparatus according to claim 1, further comprising a member on which the first grating and the second grating are formed.

6. The position detection apparatus according to claim 1, wherein at least one of the first grating and the second grating is a phase grating.

7. The position detection apparatus according to claim 1, wherein the light receiver includes a plurality of light receiving elements.

8. The position detection apparatus according to claim 1, wherein the detector further includes:
a fourth grating on an optical path between the light source unit and the object;
a fifth grating on an optical path between the object and the light receiver; and
a sixth grating on an optical path between the fifth grating and the light receiver,
wherein the light from the light source unit transmits through the fourth grating to form a third periodic image on an optical path between the fourth grating and the fifth grating,
wherein light corresponding to the third periodic image transmits through the fifth grating to form a fourth periodic image on the sixth grating, and
wherein the signal processor is configured to acquire information related to a gap between the detector and the object based on a phase of a signal corresponding to light detected by the light receiver via the sixth grating.

9. The position detection apparatus according to claim 1, wherein the part includes a grating in a plane different from the incident plane,
wherein the detector further includes a seventh grating where reflected light from the grating included in the part transmits,
wherein the light from the light source unit is reflected by the grating included in the part and then transmits through the seventh grating to be received by the light receiver, and
the signal processor is configured to acquire information related to a relative position, other than the gap, between the detector and the object based on a signal corresponding to light detected by the light receiver via the seventh grating.

10. A force sensor comprising:
a base member;
a displacement member;
an elastic supporting member provided between the base member and the displacement member to support the base member and the displacement member; and
a position detection apparatus configured to obtain information related to a position of the displacement member relative to the base member,
wherein an external force that acts on the displacement member is obtained based on the obtained information,
wherein the position detection apparatus illuminates light from a light source unit onto an object and receives reflected light from the object on a light receiver to obtain position information of the object, the position detection apparatus including:
a detector including the light source unit and the light receiver; and
a signal processor configured to process a signal from the light receiver,
wherein the detector includes:
a first grating on an optical path between the light source unit and the object;
a second grating on an optical path between the object and the light receiver; and
a third grating on an optical path between the second grating and the light receiver,
wherein the light from the light source unit transmits through the first grating to form a first periodic image on an optical path between the first grating and the second grating,
wherein light corresponding to the first periodic image transmits through the second grating to form a second periodic image on the third grating,
wherein the signal processor is configured to acquire information related to a gap amount between the detector and the object based on a phase of a signal corresponding to light detected by the light receiver via the third grating, and wherein the position detection apparatus comprises a part on the object, the light from the light source unit being incident on the part, the part having no grating in an incident plane of the light from the light source unit onto the object.

11. An apparatus comprising:
a movable portion;
a force sensor; and
a controller configured to control the movable portion based on a force obtained by the force sensor,
wherein the force sensor includes:
a base member;
a displacement member;
an elastic supporting member provided between the base member and the displacement member to support the base member and the displacement member; and
a position detection apparatus configured to obtain information related to a position of the displacement member relative to the base member,
wherein an external force that acts on the displacement member is obtained based on the obtained information,
wherein the position detection apparatus illuminates light from a light source unit onto an object and receives reflected light from the object on a light receiver to obtain position information of the object, the position detection apparatus including:
a detector including the light source unit and the light receiver; and
a signal processor configured to process a signal from the light receiver,
wherein the detector includes:
a first grating on an optical path between the light source unit and the object;
a second grating on an optical path between the object and the light receiver; and
a third grating on an optical path between the second grating and the light receiver,
wherein the light from the light source unit transmits through the first grating to form a first periodic image on an optical path between the first grating and the second grating,
wherein light corresponding to the first periodic image transmits through the second grating to form a second periodic image on the third grating,
wherein the signal processor is configured to acquire information related to a gap amount between the detector and the object based on a phase of a signal corresponding to light detected by the light receiver via the third grating, and
wherein the position detection apparatus comprises a part on the object, the light from the light source unit being incident on the part, the part having no grating in an incident plane of the light from the light source unit onto the object.

* * * * *